W. H. TROUT.
EDGING MACHINE FOR LUMBER.
APPLICATION FILED MAR. 5, 1910.

1,203,940.

Patented Nov. 7, 1916.
9 SHEETS—SHEET 1.

Fig. 1

William H. Trout, Inventor

Witnesses
Rose Holstein
M. W. Blackburn

By George Wetmore Colby
Attorney

W. H. TROUT.
EDGING MACHINE FOR LUMBER.
APPLICATION FILED MAR. 5, 1910.

1,203,940.

Patented Nov. 7, 1916.
9 SHEETS—SHEET 4.

Witnesses

William H. Trout, Inventor,
By
Attorney

W. H. TROUT.
EDGING MACHINE FOR LUMBER.
APPLICATION FILED MAR. 5, 1910.

1,203,940.  Patented Nov. 7, 1916.
9 SHEETS—SHEET 5.

Witnesses  William H. Trout, Inventor.

Attorney

W. H. TROUT.
EDGING MACHINE FOR LUMBER.
APPLICATION FILED MAR. 5, 1910.

1,203,940.

Patented Nov. 7, 1916.
9 SHEETS—SHEET 9.

UNITED STATES PATENT OFFICE.

WILLIAM HENRY TROUT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

EDGING-MACHINE FOR LUMBER.

1,203,940.  Specification of Letters Patent.  Patented Nov. 7, 1916.

Application filed March 5, 1910. Serial No. 547,388.

*To all whom it may concern:*

Be it known that I, WILLIAM HENRY TROUT, of Milwaukee, Wisconsin, have invented an Edging-Machine for Lumber, of which the following is a specification.

This invention relates to the machine used for trimming the edges of sawed lumber, commonly known in lumber-mills as the edger.

The object of my invention is to provide a machine of this character free from many of the defects and deficiencies of those heretofore in use, and having in addition certain novel improvements and conveniences.

More particularly I aim, first, to provide improved means for holding the saws upon the saw-shaft in rigid alinement, while at the same time permitting them to slide freely upon the shaft and to approach closely to one another; secondly, to provide means for lubricating the sliding of the saws upon the shaft without danger of either wasting or slinging the lubricant, and without the necessity of frequent reoiling; thirdly, to provide improved means for supporting the saw-shaft bearings which will permit of the ready removal of the saws from the shaft when said bearings are removed; fourthly, to provide an improved crane for supporting said bearings during their removal and to enable them to be readily removed and replaced in a few minutes' time; fifthly, to provide a novel arrangement of saw-guides which can be by a simple shifting-movement raised out of the way of the saw when the latter is to be taken off of the shaft, and provided with a simple adjustment for taking up wear; sixthly, to provide improved saw-guide carriers having a lock to set them at given spacings as well as a special lock to set them at fractional spacings, improved lubricating means and a novel device for overcoming the difficulty produced by the width of the saw-kerf which prevents the use of the fixed spacings for both one-board and two-board cuttings on the ordinary edger as heretofore made; seventhly, to provide improved means for changing the rate of feed of the lumber; and eighthly, to provide special means for raising the feed-rolls when very thick beams or joists are to be sawed.

To these and other ends as will hereinafter appear I provide such constructions and combinations as are set forth in the following detailed description and specifically pointed out in my claims.

The nature of my said improvements will best be understood from a consideration of a concrete embodiment thereof representing the most improved form of my edging-machine, represented in the accompanying drawings, wherein, Fig. 7 is a plan thereof; Fig. 9 is a side view and Fig. 10 an end view from the left of Fig. 9, of the inner member of the guide-carrier; Figs. 11 and 12 are vertical cross-sections on the planes 11 and 12 respectively, of the elements shown in Fig. 5; Fig. 13 is a plan-section of the same on the stepped plane 13; Fig. 27 is a side elevation of one of the end bridge-trees for the saw-shaft with bearing-cap and crane for removing the same; Fig.

28 is a plan view of the same showing in dotted lines the position assumed by these elements when the bridge-trees are swung away to permit removal of the saw; Fig. 29 is a longitudinal section of the bridge-tree; Fig. 30 is a side elevation of the feed-driving mechanism showing the speed-changing device and the shifting-mechanism therefor.

In these drawings each reference numeral and character refers to the same part or element in each figure.

The edger shown in the drawings is a single edger, provided with six saws by way of illustration, and it will be understood of course that the same principles may be applied to the double-edger and to any number of saws without departing from my invention. The main frame comprises the three transverse frame-castings A, A'; a pair of longitudinal channels B set in babbitt-lined recesses $a'$ in the frame-castings and secured thereto by cap-screws $a^2$; a pair of longitudinal bars C, which I prefer to make of double-extra-heavy gas-pipe, and which are firmly secured to the castings A by means of bolting-caps $a^3$ and set in long cylindrical sockets $a^4$ between the frame-castings and caps $a^3$; and a longitudinal shaft D, also preferably made of double-extra-heavy gas-pipe, rigidly secured in long cylindrical sockets $a^5$ formed between the frame-castings and a bolting-cap $a^6$. The shaft C acts as a pintle or pivot for the press-roll swing-arms, as will be hereinafter described. While my invention is not restricted to this or any form of frame, the above described makes a simple and solid form.

Figure 1:
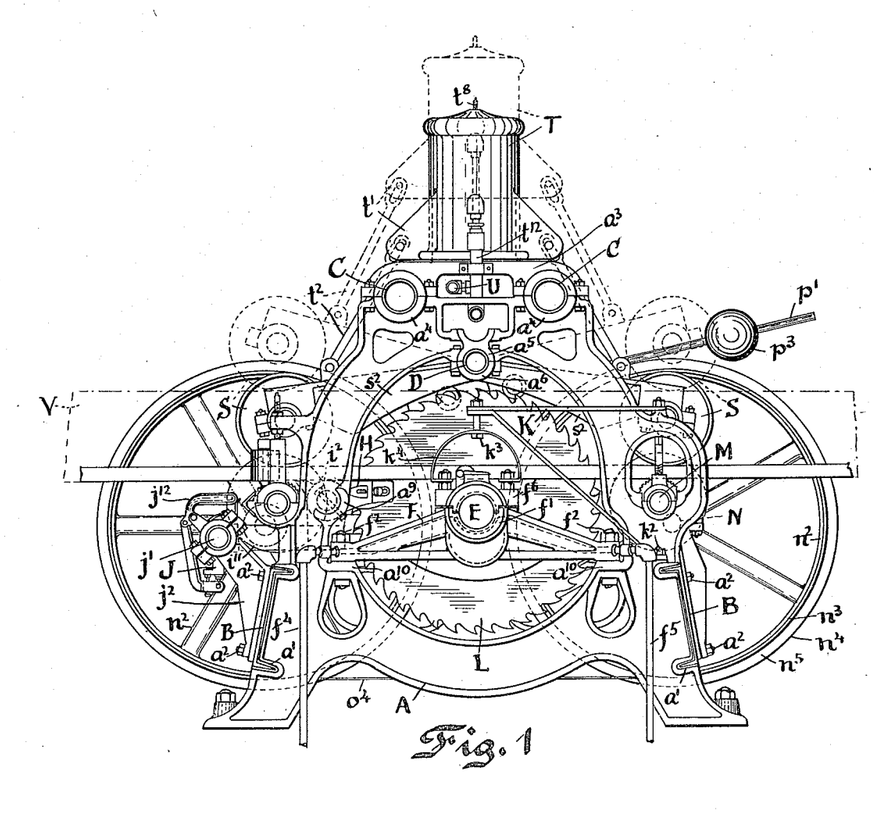
Figure 1 is a front-end elevation of the complete machine.
Figure 2:
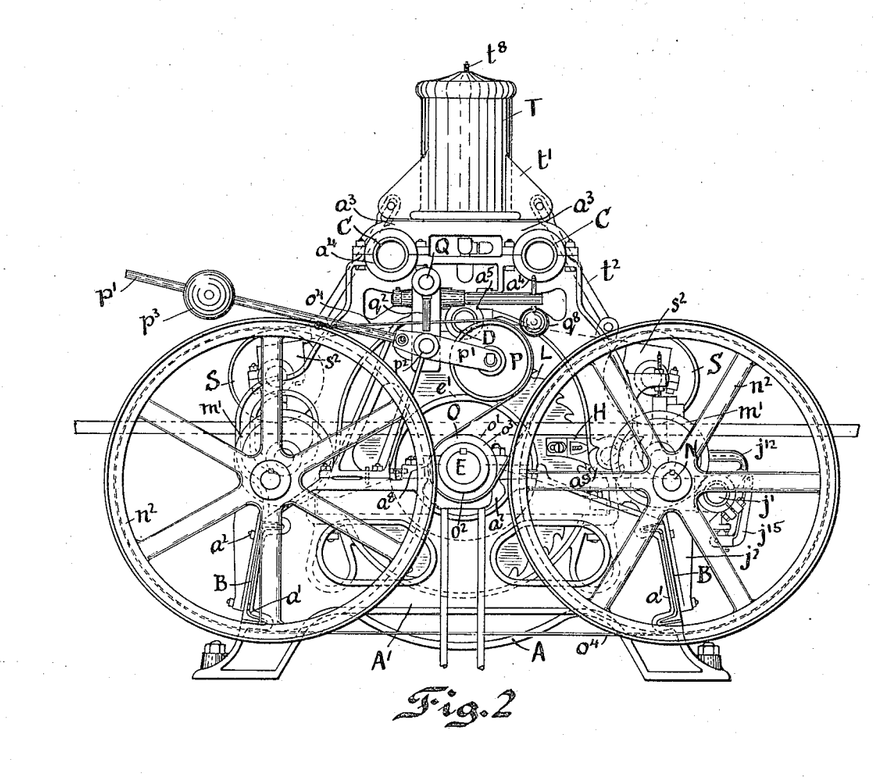
Fig. 2 is a rear-end elevation thereof.
Figure 3:
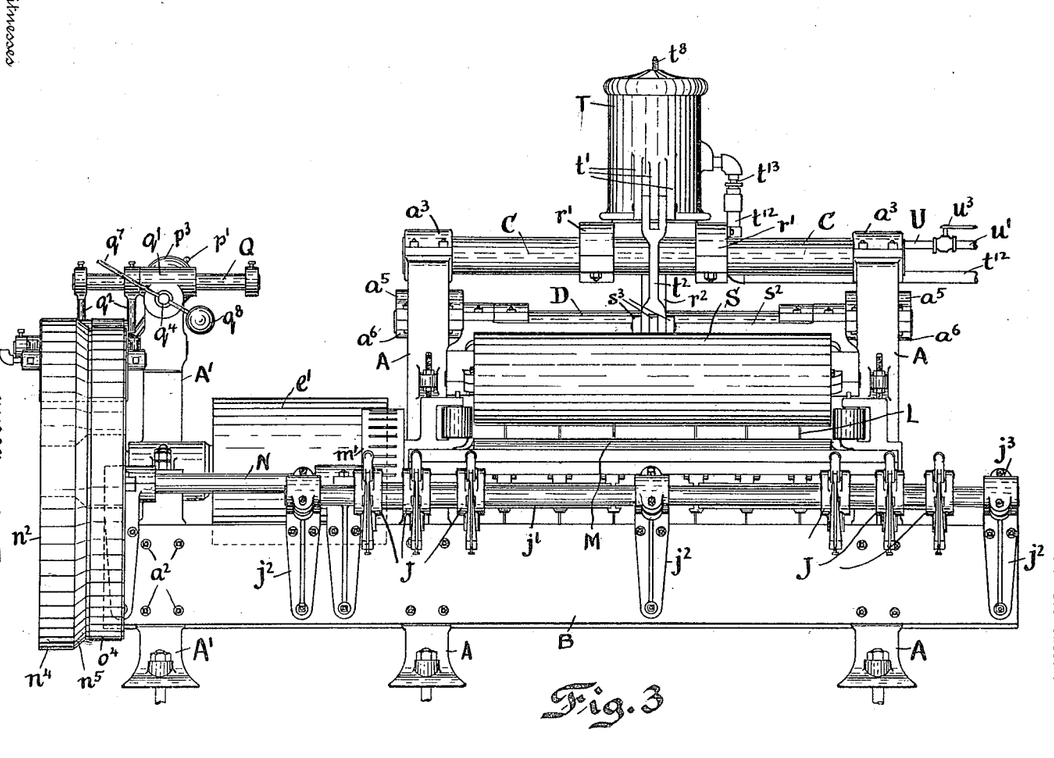
Fig. 3 is a front-side elevation thereof.
Figure 4:
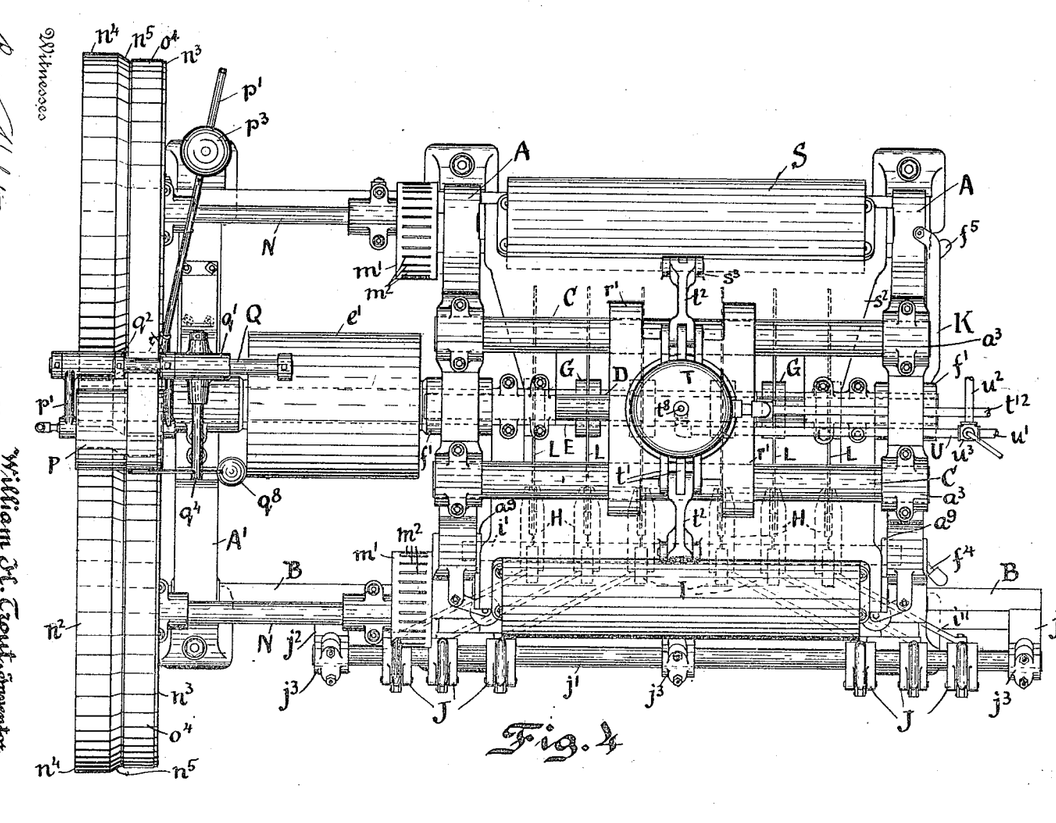
Fig. 4 is a plan-view thereof.

The saw-shaft E is mounted in bearings $f'$ on a pair of bridge-trees F, carried by the frame-castings A, and a third bearing $a^7$ formed on the frame-casting A' and provided with a cap $a^8$. Said saw-shaft carries between the frame-castings A, A', the usual driving-pulley $e'$, and upon its overhung rear end it carries a feed-roll-driving pulley O, which will be hereinafter described. Upon this shaft, set in collars G, are slidably mounted the saws L, and these saws are shifted by means of saw-guides H carried upon the saw-guide carriers I, which slide upon a longitudinal guide-rod $i'$, the ends of which are secured in sockets $a^9$ in the frame-castings A by means of transverse bolts $i^2$. Said guide-carriers are themselves shifted and set by means of gaging-hubs J, which slide upon a longitudinal rod $j'$, this rod being mounted upon and supported at its middle and ends by pedestals $j^2$ bolted to the channel B, one end of which is extended beyond the front frame-casting A for that purpose (see Fig. 3). The pedestals $j^2$ have bolting caps $j^3$ which hold the gage-rod $j'$ against endwise or rotational movement.

Before referring to the feed-mechanism I will describe in detail the saw-mountings and shifting-mechanism therefor.

Heretofore saws have been guided and shifted upon the shaft by means of guides comprising a pair of wooden pins abutting on each side of the saw, these pins being mounted in a yoke in such a manner that before the saw could be removed from the shaft said yoke had to be unbolted and taken down, necessitating a great deal of work. The guides in such a mounting cannot be slid back so as to disengage the saw unless they are made so small as to pass between the teeth of the saw, because otherwise they would be prevented from withdrawal by the swaging or broadened points of the teeth. Furthermore such a construction has the disadvantage that it has recesses and projections in which flying shims and pieces of bark become entangled, thus interfering with the movements of the saw and even with the sawing operations. In my construction, the said pins are replaced by flat wedge-blocks which give a much larger bearing-surface, thus preventing undue wear upon the saw and guides, and I mount each block separately in a special form of mounting enabling it to swing upwardly and at the same time retire away from the face of the saw, thereby clearing the saw, so that the latter can be taken off the shaft. Furthermore I provide means for lubricating the guide, and a simple and convenient means for adjusting it and to take up wear. This device is illustrated in detail in Figs. 5 to 13 inclusive (Sheet 5).

Figures 7, 9, 10, 11, 12, 13:
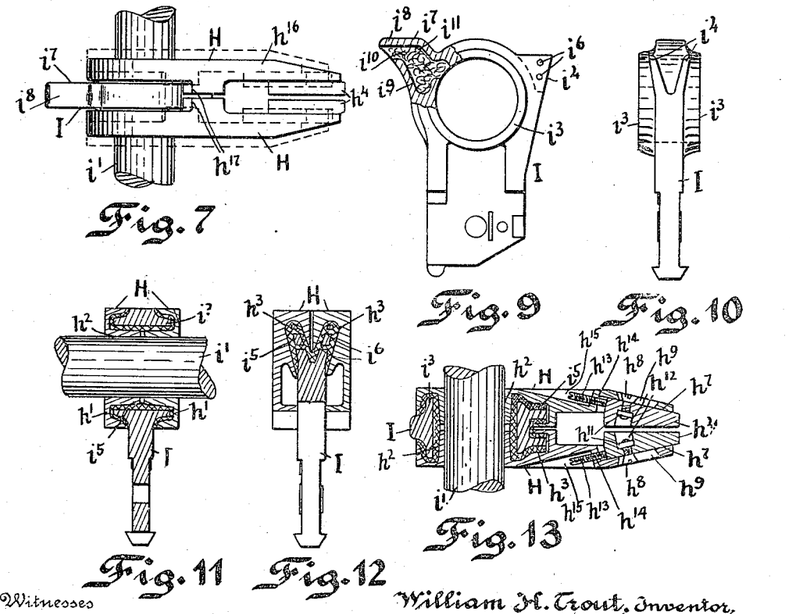
Figures 14, 15, 16, 17, 18, 19, 20:
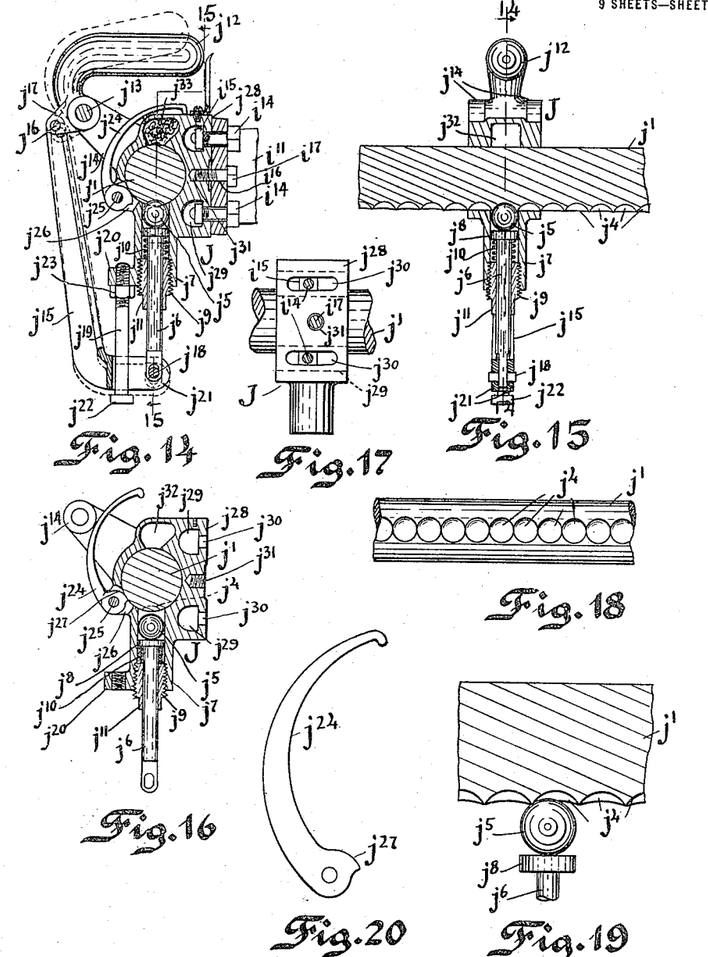
Fig. 14 is a vertical cross-section on the plane 14 of the gaging-hub of guide-carrier, the gage-rod being shown in transverse section.
Fig. 15 is a section of the same at right-angles to that of Fig. 14, taken on the plane 15.
Fig. 16 is a section of some of the parts shown in Fig. 14 on the same plane, indicating the position of the special lock when in use for gaging fractional widths of lumber.
Fig. 17 is an inner face-view of the gage-hub.
Fig. 18 is a bottom plan view of a part of the gaging-rod.
Fig. 19 is a vertical axial section through a part of the same showing the action of the ball-gage.
Fig. 20 is a side elevation on an enlarged scale of the special-set locking-bar.

The guide-carrier I as aforesaid slides on the guide-rod $i'$ and has an annular hub $i^3$ on each side which acts as a pivot-bearing for the guide, the latter being recessed as shown at $h'$, Figs. 11 and 13, and the inner face $h^2$ of the hubs of the guides H being bored to fit the guide-rod $i'$, so that while the guide-carrier I actually slides upon and is guided by said guide-rod in its movements, it does not touch the latter. This insures the accurate centering of the guide. Furthermore, said carrier I has on the saw-side a pair of oblique projecting cam-lugs $i^4$ which are received in correspondingly shaped recesses $h^3$ of the guide (see Figs. 9, 10, 12 and 13). All the bearing faces of the guide-carrier are lined with babbitt $i^5$, which is retained upon the faces of the cam-lugs $i^4$ by providing the latter with holes $i^6$ joining the opposite faces (see Figs. 9 and 12).

Figures 5, 8:
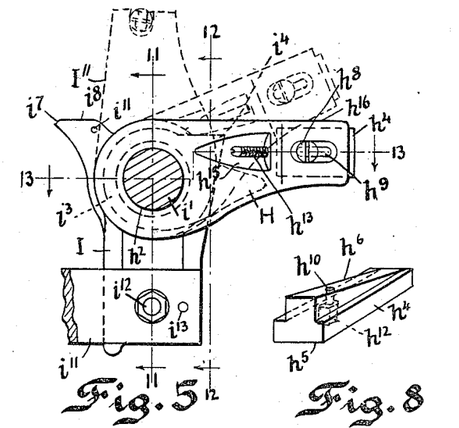
Fig. 5 is a side elevation of one of the saw-guides and a part of the guide-carrier, the guiding-rod therefor being shown in section.
Fig. 8 is a perspective view of one of the wear-blocks for the same.
Figure 6:
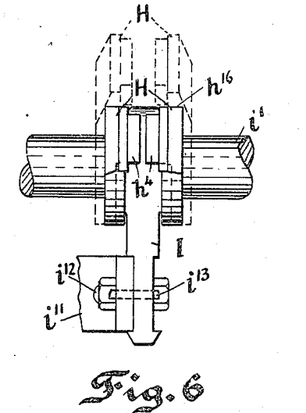
Fig. 6 is an end elevation thereof.

The active end of each guide H carries a wedge-shaped bearing-block $h^4$, shown in detail in Fig. 8. Said block has a flat wearing-face $h^5$ and a wedge-shaped lug $h^6$ fitting within a correspondingly shaped socket $h^7$ on the inner face of the guide and retained therein by a screw $h^8$ running in a slot $h^9$ in the guide, said screw passing through a hole $h^{10}$ in the back of the wedge-block and being engaged with a nut $h^{11}$ fitting in a square recess $h^{12}$ in the face of the block; whereby the block is readily tightened by a screw-driver applied to the head of the screw $h^8$, as will be clear from Fig. 13. The wear-block is adjusted to a position against the face of the saw by means of an adjusting-screw $h^{13}$ threaded into a socket $h^{14}$ opposite the back end of the block, the head of said screw lying within a recess $h^{15}$; so that by loosening the screw $h^8$ with one screw-driver, turning up the screw $h^{13}$ by another, and finally retightening the screw $h^8$, the block can be set in any desired position in a few moments of time. Now it will be clear from the construction, and especially from a comparison of the dotted and full-line positions in Figs. 5, 6, and 7, that as the guides H are swung up they also retire from the face of the saw and thereby clear the teeth thereof. When in their lowered position they are supported so that their upper faces $h^{16}$ form horizontal bearing surfaces for the lumber which is being sawed, the guides in this case resting upon the ends of the lugs $i^4$. Further, the guide-carrier is provided with a rearwardly projecting heel $i^7$ which has a horizontal upper face $i^8$ on the same level as the faces $h^{16}$, acting both as a bearing-surface for the lumber and also a support for the guides when they are swung upwardly, each guide having an internal shoulder $h^{17}$ which is engaged by the heel $i^7$ in the second dotted-line position I'' of Fig. 5. Furthermore the heel $i^7$ is internally recessed or cored so as to form a chamber $i^9$ which is open at one end for the insertion of waste $i^{10}$ or other lubricant-holder, the lubricant being inserted through a perforation $i''$ in the side of the guide-holder, thus providing for the constant lubrication not only of the bearing-faces between the guide and carrier, but also between the guide and the guide-rod $i'$. It will be seen from the above that each guide can be swung up independently of the other, and in this swung-up position can be disengaged bodily from the guide-carrier and moved endwise if it is desired for attention to its interior face.

The guide-carriers are themselves secured to and move with the gage-hubs J, and both the construction of these gage-hubs and the peculiar manner of securing them to the guide-holders, which provides for the elimination of the saw-kerf and shrinkage as factors in sawing the lumber either into one or several boards, form important features of my invention. I will first describe in detail the construction of the gage-hub J, reference being had in Figs. 14 to 20 inclusive (Sheet 6 of the drawings). Said gage-hub as aforesaid slides upon the gage-rod $j'$, and this gage-rod has in its lower surface a series of evenly spaced spherical recesses $j^4$. The spacing of these recesses will be at even units of measurement plus the lumber shrinkage for that distance. For example, if the standard difference in width of lumber is taken as two inches, and the shrinkage $\frac{3}{8}$ inch per foot of width, then the recesses $j^4$ will be spaced at $2\frac{1}{16}$ inches from center to center. With these recesses engages a hardened steel ball $j^5$ which is of the same radius as the recesses so as to fit neatly therein, and said ball is kept pressed resiliently into the recess in which it happens to be by a reciprocating plunger $j^6$ mounted in a socket $j^7$ on the bottom-side of the gage-hub. Said plunger has an enlarged head $j^8$ which is guided by the inner cylindrical surface of the socket and is of the same diameter as the ball $j^5$, and the body of the plunger fits within the bore of the screw-plug $j^9$, whose threads engage a corresponding set of female threads on the lower end of the socket, a coiled compression-spring $j^{10}$ being inserted between the plug $j^9$ and the plunger-head $j^8$ so as to keep the latter pressed resiliently into one of the recesses $j^4$ as aforesaid. The plug $j^9$ may have a rectangular head $j''$ by which it is turned in or out and the tension of the spring thus adjusted.

Now while the above arrangement is in a certain sense complete in itself because the gage-hub can be shifted sidewise from notch to notch without specially depressing the ball $j^5$, the sidewise pressure sufficing to depress the ball enough to enable it to pass from one recess to the next, it is preferable to provide some means for depressing the ball, and such means, as here shown, comprise a shifting-handle $j^{12}$ pivoted upon a pin $j^{13}$ carried upon supporting ears $j^{14}$ on the gage-hub J; and a bent link $j^{15}$, the upper end of which is pivoted by a pin $j^{16}$ between a pair of ears $j^{17}$ formed on the handle $j^{12}$, and its lower end connected by a pin $j^{18}$ to the lower end of the plunger $j^6$, which is slotted as shown to permit the plunger and ball to move independently. By tilting the handle $j^{12}$ into the position shown in dotted lines in Fig. 14, the link $j^{15}$ is depressed, and carries with it the plunger $j^6$ a sufficient distance to retract the ball $j^5$ not completely but nearly from the recess $j^4$. For this purpose the depression of the plunger is limited by a stop consisting of a bolt $j^{19}$ screwed into a lug $j^{20}$ formed on the lower end of the socket-lug $j^7$, said bolt passing between the two arms $j^{21}$ of the forked end of the link $j^{15}$, and having an enlarged head $j^{22}$ which acts as an abutment for the link at the end of its downward movement; and a locknut $j^{23}$ is provided to clamp the bolt $j^{19}$ in its adjusted position; in which position the ball will touch the division and on account of the slot in lower end of plunger will spring downward and returning giving a slight jar to the hand of the operator so that he notices the passage and has a mental conception of the distance moved.

In order to provide for those cases where boards of irregular or odd widths are to be cut, I provide a special locking-device for securing the gage-hub at any point of the bar $j'$ irrespective of the depressions $j^4$. Such special-lock consists of a clamping-lever $j^{24}$, which is pivoted on a pin $j^{25}$ carried by the gage-hub, which latter is cut away at this point so as to leave an open space $j^{26}$ in which the clamping-lever works. This clamping-lever is provided with an eccentric edge $j^{27}$, which, when the lever is pulled out in the position of Fig. 16, jams against the gage-rod $j'$ and thereby holds the gage-hub firmly in the position in which it is set. When in its normal position, Fig. 14, the end of the clamping-lever $j^{24}$ rests upon the top of the gage-hub, and in this position the face $j^{27}$ is sufficiently retracted from the surface of the gage-rod to permit of free movement.

Figures 21, 22, 23, 24, 25, 26:
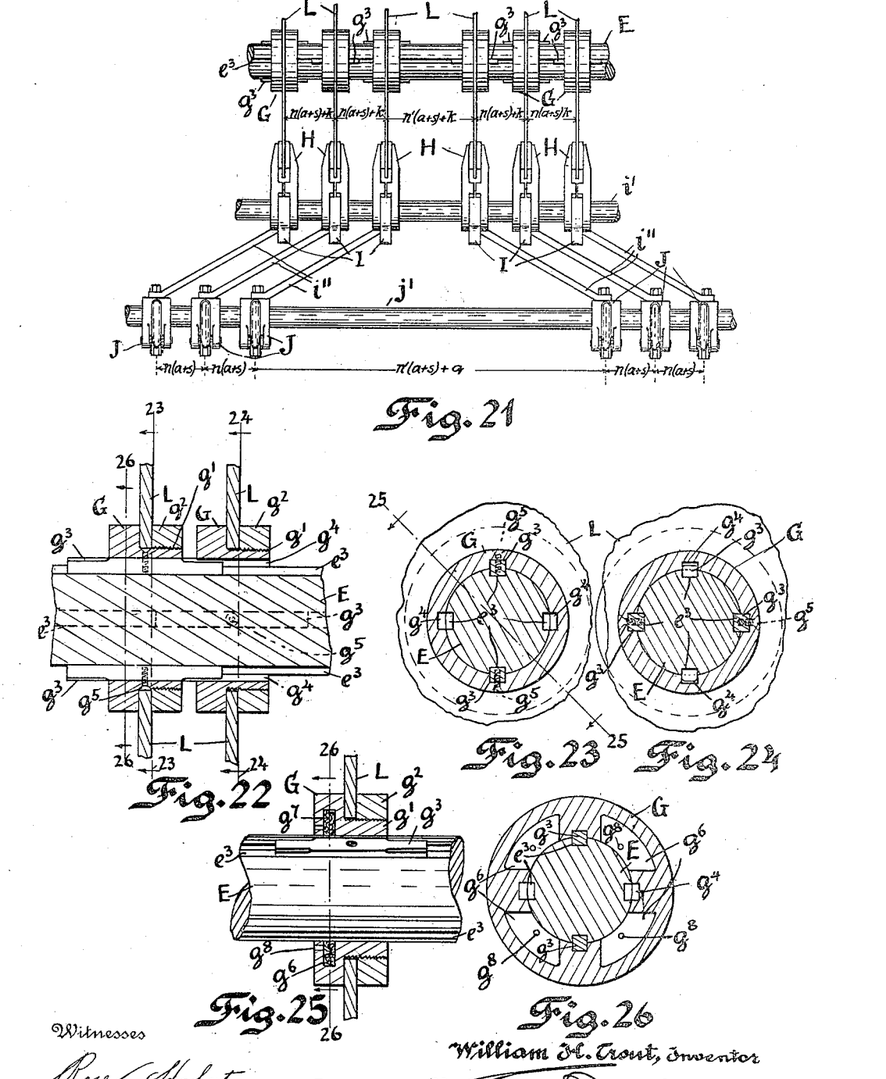
Fig. 21 is a plan view of the complete set of guide-carriers in position.
Fig. 22 is a longitudinal section through the saw-shaft, saw-collars and saws, illustrating the improved mountings for the saws.
Figs. 23 and 24 are transverse sections of the same on the planes 23 and 24 respectively.
Fig. 25 is an axial section through the saw-collar and saw on the plane 25, the saw-shaft being shown in elevation, to illustrate my improved lubricating means.
Fig. 26 is a transverse section therethrough on the plane 26.

It will be seen from the above description of the gage-hub that I have provided for shrinkage of the lumber by setting the gaging depressions at a distance sufficiently greater than the actual differences of width of the seasoned lumber to allow for shrinkage; that is, if $a$ denotes the standard difference in width of lumber, and $s$ denotes the shrinkage for the width $a$, the spacing of the depressions $j^4$ is made equal to $a+s$, and the distance from center to center of any two gage-hubs on the gage-rod will be $n(a+s)$, where $n$ is any integral number, when the special-lock is not in use (see Fig. 21). It remains now to provide for the saw-kerfs, which so far as I know has not yet been accomplished in the construction of edgers. If this is not done, then every slab which is sawed into one board will be short in width by the width of one saw-kerf; if sawed into two boards, it will be short two kerfs; if into three boards, three kerfs, and so on. By my construction the influence of the saw-kerf is entirely eliminated, no matter how many boards the slab may be sawed into. This is accomplished as follows: Each gage-hub J is connected with its respective guide-carrier I by an obliquely extending bar $i^{11}$, which (see Fig. 5) is secured immovably to the guide-carrier, as by a bolt $i^{12}$ and dowel-pin $i^{13}$, and to some extent adjustably to the gage-hub in the manner illustrated in Figs. 14 and 17. The inner face $j^{28}$ of the gage-hub J, to which the bar $i^{11}$ is secured, is underlaid by a pair of tubular recesses $j^{29}$, which are connected with the face $j^{28}$ by slots $j^{30}$, through which pass clamping-bolts $i^{14}$, the nuts $i^{15}$ of these bolts being disposed in said recesses $j^{29}$. This enables the gage-hub to be adjusted a short distance laterally with respect to the bar $i^{11}$, and clamped in its adjusted position. Now the relative positions of any two adjacent guide-carriers is so arranged that, when the distance from center to center of the two gage-hubs is a convenient number of lumber widths $n(a+s)$ the distance from center to center of the corresponding guide-carriers is $n(a+s)+k$, where $k$ is the width of the saw-kerf; so that the actual width of the board sawed with the guide-carriers in this position would be $n(a+s)$. An exception to this rule is found between the two middle guide-carriers and gage-hubs, where, when the two carriers are set to an even lumber width plus the kerf, $n'(a+s)+k$, the distance between the gage-hubs may be any quantity, $n'(a+s)+q$, suitable to dispose the gage-hubs at a convenient place at opposite sides of the machine where they will be out of the way of the lumber and can be readily reached by the operatives. This grouping, however, is not an essential feature as measurements may begin at the center. It will be seen that by this arrangement, each saw-kerf that is actually made, and no more, is provided for, whether the slab be cut into two, three or more widths; and that the width as cut will be exactly correct.

It will be understood, of course, that the width of kerf differs to a slight extent with different saws, and therefore the relative distances between the gage-hubs and guide-carriers will be adjusted to the saw-kerf in the individual machine by shifting the bar $i''$ on the gage-hub before tightening up the bolts $i^{14}$. When the correct adjustment has been attained, the bolts $i^{14}$ are turned up tight, and a hole $i^{16}$, $j^{31}$, bored and tapped in the bar $i^{11}$ and gage-hub, in which is inserted a cap-screw $i^{17}$, which locks the adjustment.

To secure lubrication in the sliding movements of the gage-hub, I provide a lubricant-chamber $j^{32}$, which may be packed with oil-saturated waste $j^{33}$.

In the mounting of the saws on the saw-arbor the difficulty with previous constructions has been to secure a wide enough mounting while at the same time permitting the saws to come close together. If the saw-collars be made narrow, they will soon become loose and wabbly by continual sidewise shifting. Furthermore, the old form of saw-collar is subject to great difficulty in maintaining proper lubrication, as oil will not readily remain on the shaft when it is turning at a high rate of speed, and if thrown or poured on to the shaft will be scattered by centrifugal force. In my improved construction of saw-collars, Figs. 22 to 26, the collar itself G is made narrow, this collar being reduced and threaded at $g'$ to receive the clamping-nut $g^2$ which holds the saw L in place. The lateral bearing-surface upon the shaft is formed by two elongated keys $g^3$, which are fixed in grooves $g^4$ in the collar and slide in slots $e^3$ in the shaft E, the ends of said keys extending beyond the ends of the collars G a considerable distance, but preferably not greater than half the width of the collar. Now it will be seen from Figs. 22, 23, 24, and 26 that I have provided four grooves $e^3$ in the shaft and four corresponding grooves $g^4$ in each collar, but that any one collar carries keys $g^3$ in only two of the grooves, in which they are secured by screws $g^5$. This enables the keys on any collar to be received in the corresponding grooves of the adjacent collar when the two saws are moved close together, so that the keys do not in any way interfere with the approaching of the saws. I of course realize that while I have shown four grooves, any other number of grooves might be provided, the principle being that the keys are fixed in one collar opposite to vacant grooves in the next. In addition, I provide lubricating means in the form of a set of chambers $g^6$ between the grooves $g^4$, these chambers being packed with oil-saturated waste $g^7$, to which access is had for lubrication through the holes $g^8$.

Figures 27, 28, 29, 30:
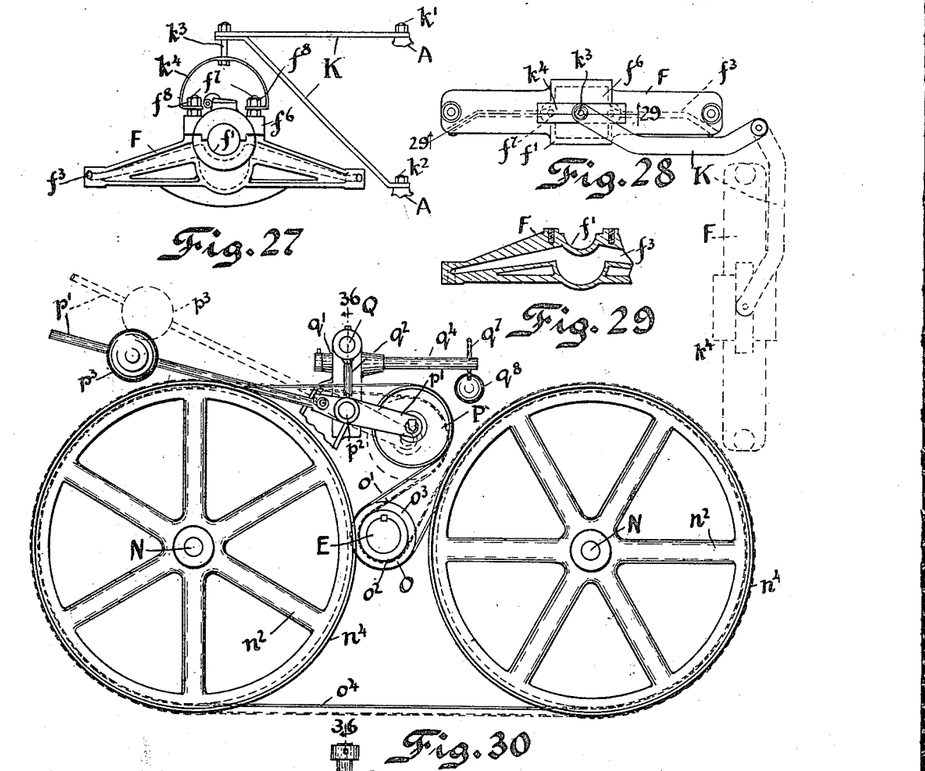

Referring now to the means of mounting the saw-shaft E, I have shown in Figs. 27 to 29 my improved water-cooled bridge-tree F, and means for removing it when it is desired to remove the saws from the shaft. Said bridge-tree rests upon pedestals $a^{10}$ on the frame-castings A, and is secured thereto by bolts $f^2$; and it has an interior chamber $f^3$ connected at its ends with inlet- and outlet-pipes $f^4$ and $f^5$, by means of which a continuous water-circulation can be maintained to cool the bearing-surface. The bearing $f'$, is covered by a cap $f^6$ which is secured to the bridge-tree by bolts $f^7$. For removing the bridge-tree I provide a crane K, which is pivoted upon a pair of studs $k'$, $k^2$, on the frame-casting A and has at its end a depending pin $k^3$, from the end of which is suspended a yoke $k^4$, whose ends are perforated to pass over the bolts $f^7$, and they may be secured thereto by extra nuts $f^8$. The joints between the bolt $k^3$, the crane K, and the yoke $k^4$ are loose to permit of sufficient sidewise movement in removing the bridge-tree to permit of the latter moving in a straight line until it is free of the end of the shaft. When the bridge-tree is to be removed, it is simply necessary to slacken the bolts that hold bridge-tree at its ends and pull the bridge-tree off, the crane always carrying nearly the whole weight of bridge-tree K, and then swing it back into the dotted-line position as shown in Fig. 28, whereupon the shaft is free to permit the saws to be taken off or put on. As this is a frequent operation in machines of this class such a device is very desirable to enable the operation to be quickly performed without using any extra manual assistance.

Figures 32, 33, 34, 35, 36, 37:
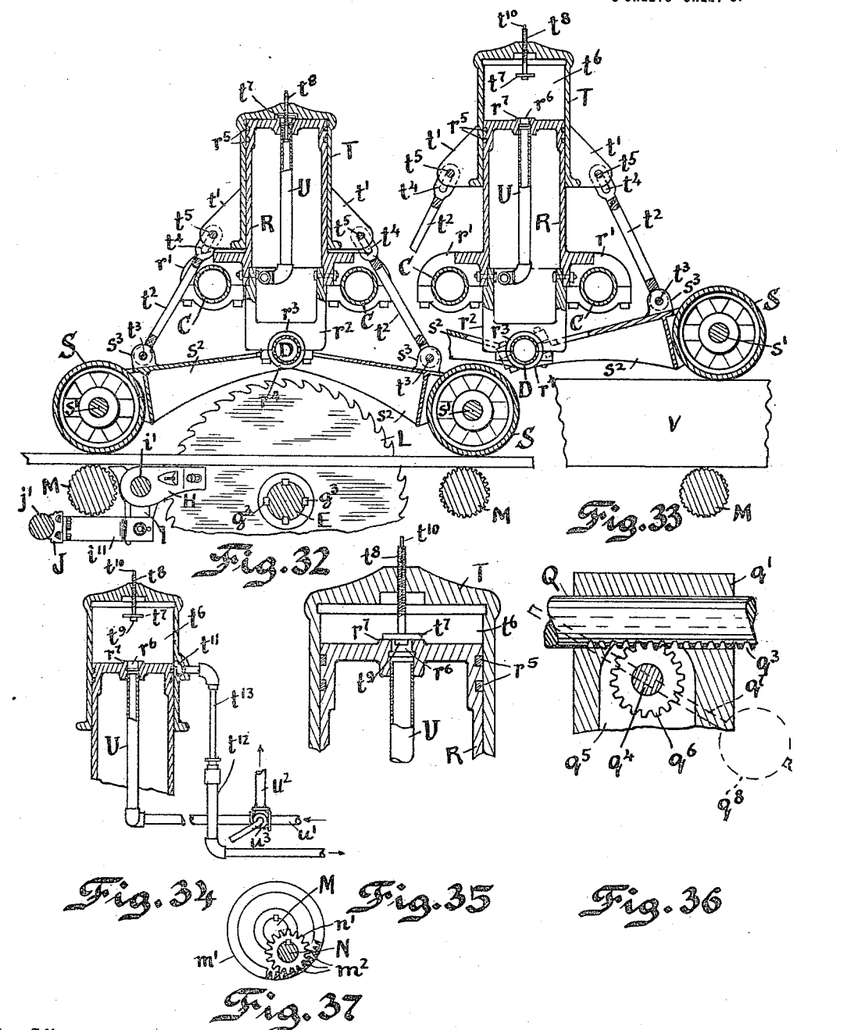
Fig. 32 is a longitudinal section through the axis of the cylinder of the press-roll-raising mechanism in its lowered position.
Fig. 33 is a similar view showing the parts in raised position.
Fig. 34 is a fragmentary axial section of the cylinder and valves of said mechanism taken on a plane at right-angles to that of Fig. 33, the parts being in raised position.
Fig. 35 is an axial section through the upper part of the cylinder on a larger scale, showing the cushioning position of the latter.
Fig. 36 is a fragmentary section on the plane 36 of a part of the belt-shifting mechanism.
Fig. 37 is a detail view, partly in section, of the feed-roll-driving gears.

Considering now the feed-mechanism, I provide a novel arrangement of stepped pulleys furnishing two rates of feed. The feed-mechanism is as follows: The feed-rolls proper M, turning in bearings in the frame-castings A, are driven from supplementary shafts N which are connected with the feed-rolls by pinions $n'$ meshing with annular gears $m'$ on the ends of the feed-roll shafts, such annular gears being of peculiar construction, inasmuch as the clearances between the teeth of said gears are formed as slots $m^2$ in the periphery of the gears (Fig. 37). The purpose of this construction is to prevent said gears from becoming encumbered with sawdust, which in the ordinary form of gearing lodges between the teeth and becomes continually more compacted by the pressure of the points of the intermeshing gear, until finally the gearing becomes too much clogged to run. In my construction the sawdust, as fast as it is pressed down by the pinion-teeth, passes out through the slots $m^2$ and therefore never reaches the clogging point.

Figure 31:
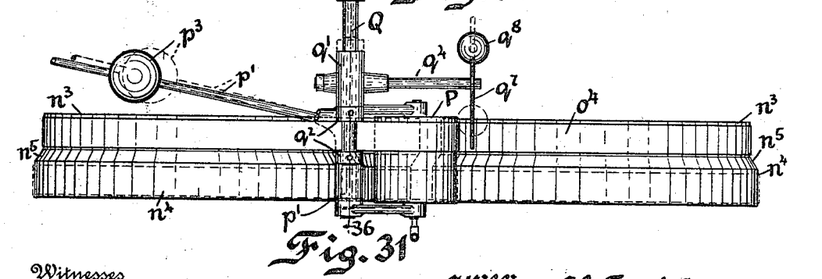
Fig. 31 is a plan view of the same.

On the end of each shaft N is mounted a main feed-roll driving-pulley $n^2$, which has two belt-faces $n^3$, $n^4$, separated by a conical face $n^5$. Coöperating with these pulleys is the small pulley O previously mentioned, which has likewise two faces $o'$, $o^2$ separated by an intermediate conical face $o^3$. Over all three pulleys runs a driving-belt $o^4$, and this belt runs also around the tightener-pulley P, which is slung upon a forked bar $p'$ pivoted upon a pin $p^2$ and weighted on the end opposite the pulley by the sliding-weight $p^3$. It will be observed that the position of the pivot $p^2$ with relation to the pulley is such as to produce a considerable tension upon the belt, which is practically independent of its position on one or other of the two sets of driving-faces of the three pulleys, and that in shifting the belt from one set of driving faces to the other, the tightener-pulley P will move up or down as the position of the belt requires. In order to shift the belt, I provide a shifting-fork Q sliding in a socket $q'$ on the frame-casting A', said fork having a pair of depending prongs $q^2$ one on each side of the belt, and as the fork is moved from one side to the other, the belt will be caused to run on one or other set of driving-pulley faces, the tightener-pulley P varying in position accordingly. To shift the fork Q, a series of rack-teeth $q^3$ are cut on its under side, and a rock-shaft $q^4$ is pivoted transversely to it in the socket $q'$, carrying in a recess $q^5$ a pinion $q^6$ which meshes with the rack-teeth $q^3$, and said shaft carries on its face end a rock-arm $q^7$, on one end of which is a weight $q^8$ which acts as a tumble-bob to maintain the belt in the position to which it is shifted, said weight lying on one side of the shaft in one position of the belt and on the other side in the other position.

Considering now the press-roll-operating mechanism, which is shown in detail in Figs. 32 to 35 inclusive, a fixed cylindrical trunk R, which may be cored out internally, is mounted in upright position upon the middle of the cross-bars C by means of supporting lugs $r'$, and the shaft D, which acts as a pivot for the swing-arms hereinafter mentioned, is also braced against said trunk by means of a depending yoke $r^2$, provided with a socket $r^3$ therefor and cap $r^4$. The press-rolls S are mounted on shafts $s'$ turning on the ends of the swing-arms $s^2$, which as aforesaid turn about the shaft D as an axis. Upon the trunk R slides the upright cylinder T, and is made steam-tight therewith by packing-rings $r^5$ on the periphery of the trunk. The cylinder T has lateral ears $t'$ for connecting it by forked links $t^2$ with the swing-arms $s^2$, the links being pivoted upon pins $t^3$ carried by ears $s^3$ on the swing-arms, and having slots $t^4$ at their upper ends through which pass bolts $t^5$ mounted on the ears $t'$, and through the center of the trunk R passes a steam-pipe U, which opens into the cylinder-chamber $t^6$ through a valve-seated orifice $r^6$, and is divided at some convenient point into two branches $u'$, $u^2$, between which and the pipe U is a three-way valve $u^3$. One of the branches, $u'$, is connected with a source of steam-supply, while the other, $u^2$, is an exhaust-pipe which may open into the air or a condenser; so that when the handle of the valve $u^3$ is turned to connect the pipe U with the branch $u'$, the steam enters the cylinder-chamber $t^6$ and raises the cylinder and press-rolls to permit the insertion of any size of joist or beam V, Fig. 33; and when the lumber has been inserted the handle of the valve $u^3$ is turned into the opposite position so as to connect the pipe U with the exhaust-branch $u^2$, thereby releasing the steam in the cylinder and allowing the press-rolls to fall and rest upon the lumber. In order, however, to prevent any sudden drop of the press-rolls which would bring undue shock upon the machine I provide cushioning-means in the form of a disk-valve $t^7$, which is mounted on the free end of a screw-stud $t^8$ threaded into the head of the cylinder T coaxially with the orifice $r^6$; said valve being supported by the head $t^9$ of the stud and being free to move vertically thereon. When the cylinder reaches a certain point in its descent, predetermined by the position to which the stud $t^8$ is adjusted by the application of a wrench to its squared end $t^{10}$, the valve-disk $t^7$ will rest upon its seat $r^7$, closing the orifice $r^6$ and thereby confining the remaining steam within the cylinder and cushioning the descent, as the steam now only escapes or condenses slowly for the rest of the distance. Moreover, I provide a safety-device which prevents the turning on of the steam from raising the cylinder too high, this safety-device being in the form of a waste-weir or relief-aperture $t''$ on one side of the cylinder, connected with an exhaust-pipe $t^{12}$ by a sliding or telescoping-joint $t^{13}$ consisting of one pipe sliding within the other and connected by a packing so as not to interfere with the continuity of the duct. As soon as the cylinder has risen to the point at which the waste-weir $t''$ is above the edge of the trunk R, the steam will escape through the pipe $t^{12}$ as fast as it flows in, thus limiting the upward movement.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the scope of my claims.

Having thus described my invention, what I claim as new and desire to secure by Letters Patent is:

1. The combination with a guide-rod of a guide-carrier having a non-rotatable hub and sliding freely upon said guide rod and a saw-guide pivoted on the hub of said carrier.

2. The combination with a guide-rod of a guide-carrier sliding freely thereon and a pair of saw-guides pivoted on opposite sides of said carrier laterally separable and adapted to bear on opposite sides of the saw, and means for holding said guides immovable laterally when in normal operative position.

3. The combination of a guide-carrier having a pair of upstanding lugs on the inner side thereof, said lugs converging downwardly and having abrupt upper ends, and a pair of saw-guides pivotally mounted on said carrier and having corresponding oblique recesses, one on each saw-guide, fitting over said lugs and engaging the ends thereof when said carriers are in operative position; whereby a downward movement of either saw-guide is accompanied by an inward movement toward the face of the saw and an upward movement is accompanied by a retiring movement away from the saw.

4. A saw-guide comprising in combination a hub-member, and an arm-member rotatable thereon and having at its free end means adapted to bear against the face of a saw; one of said members having a helicoidal fin extending through a small angle, and the other a corresponding helicoidal recess adapted to interlock with said fin; the angle of obliquity and position of said fin and recess being such that said arm-member in rotating toward said saw is caused to approach it laterally and in rotating away from said saw is caused to depart from it laterally.

5. A saw-guide comprising in combination a hub-member, and an arm-member rotatable thereon and having at its free end means adapted to bear against the face of a saw; one of said members having a helicoidal fin extending through a small angle, and the other a corresponding helicoidal recess adapted to interlock with said fin; the angle of obliquity and position of said fin and recess being such that said arm-member in rotating toward said saw is caused to approach it laterally and in rotating away from said saw is caused to depart from it laterally; said helicoidal fin and recess being disengaged when said arm-member is turned through a certain angle from its bearing position, thereby leaving said arm member free and separable from said hub-member.

6. A saw-guide comprising in combination a hub-member, and an arm-member rotatable thereon and having at its free end means adapted to bear against the face of a saw; one of said members having a helicoidal fin extending through a small angle, and the other a corresponding helicoidal recess adapted to interlock with said fin; the angle of obliquity and position of said fin and recess being such that said arm-member in rotating toward said saw is caused to approach it laterally and in rotating away from said saw is caused to depart from it laterally; said fin and recess having interlocking abutting surfaces substantially at an abrupt angle to the direction of movement which form a rest and support for the arm in its bearing-position.

7. A saw-guide comprising in combination a hub-member having a helicoidal fin, the upper surface of said fin forming an abutment, and an arm-member having a recess of corresponding shape adapted to engage over said fin and to rotate on said hub-member; the position and angle of obliquity of said fin and recess being such that when engaged said arm-member is caused to move laterally toward the saw as it turns into bearing-position and move laterally away from it as it turns out of bearing-position; said arm having on its free end a bearing surface; and said fin acting as a support for said arm in the bearing-position.

8. A saw-guide comprising in combination a hub-member having a helicoidal fin, the upper surface of said fin forming an abutment, and an arm-member having a recess of corresponding shape adapted to engage over said fin and to rotate on said hub-member; the position and angle of obliquity of said fin and recess being such that when engaged said arm-member is caused to move laterally toward the saw as it turns into bearing-position and move laterally away from it as it turns out of bearing-position; said arm having on its free end a bearing-surface; and said fin acting as a support for said arm in the bearing-position; and said arm being furthermore disengaged from said fin in the raised position whereby it can be moved away from and completely separated from said hub-member.

In witness whereof I have hereunto set my hand this twenty-first day of February, 1910, in the presence of two witnesses.

WILLIAM HENRY TROUT.

Witnesses:
G. R. THOMPSON,
MARIE KLOSS.

Copies of this patent may be obtained for five cents each, by addressing the "Commissioner of Patents, Washington, D C."